United States Patent Office 3,684,490
Patented Aug. 15, 1972

3,684,490
PROCESS FOR RECOVERING ZINC FROM JAROSITE RESIDUE
Georg Steintveit, Odda, Norway, assignor to Det Norske Zinkkompani A/S, Odda, Norway
No Drawing. Filed Sept. 10, 1970, Ser. No. 71,249
Claims priority, application Norway, Oct. 2, 1969, 3,926/69
Int. Cl. C22f *19/00*
U.S. Cl. 75—101 R  3 Claims

ABSTRACT OF THE DISCLOSURE

A process for post treatment of jarosite residue produced by precipitation of iron in zinc sulphate solutions in the presence of K, Na and/or $NH_4$-ions. The jarosite residue is subjected to leaching with sulphuric acid, the acid addition and leaching being carried out in immediate connection with the precipitation of jarosite residue or subsequent to a preceding thickening of the jarosite slurry. The jarosite slurry contains 350–450 g./l. solid material and the leaching is carried out at 50–95° C.

---

In accordance with applicant's U.S. Pat. No. 3,434,947, a process for separation of iron from metal sulphate solutions, and also a hydrometallurgic process for the production of zinc, are known.

In brief, the process of the above patent resides in subjecting a leach residue from a neutral leaching of roasted zinc ore in diluted sulphuric acid to an acid treatment at 95° C. with a final acid strength of 80–120 g./l. $H_2SO_4$, whereby it is possible to dissolve 98–99% of the zinc content in the original roasted zinc ore, 80–90% of the iron content in the zinc ore being also dissolved since the zinc ferrites which are difficult to dissolve are decomposed by this intense leaching.

The process disclosed in the above patent relates further to the separation of the undissolved residue from the said hot leaching whereby the content of lead and silver in the zinc ore may be recovered in the form of a high grade concentrate of these metals, the iron-rich zinc solution being thereafter subjected to neutralization at 95° C. and at a pH of 1.5 in the presence of K, Na and/or $NH_4$-ions which may be added previous to or during the actual neutralization as potassium, sodium and/or ammonium salts or, in the last case, advantageously as $NH_3$.

The neutralizing agent disclosed in the above patent may consist of zinc oxide-containing substances, preferably pure ZnO, in practice, however, also ordinary zinc ore roasted by hearth roasting, flash roasting, fluidization roasting and/or sinter roasting. The greater the content of ZnO in the roasted zinc ore, the more suitable is the ore as neutralizing agent. The neutralization is carried out, as stated, at a pH of 1.5 and this acid concentration is not strong enough to dissolve the part of the iron content of the ore which is combined with zinc as zinc ferrites. Since, in practice, it may be necessary to use iron-containing zinc ores as neutralizing agent during the iron precipitation, the result is a reduced zinc yield for that part of the ore which is used as neutralizing agent; whilst it is possible to leach out 98–99% of the zinc content in the ore during the intense acid leaching at 95° C., it is possible in the iron precipitation step at a pH of 1.5 to leach out only 92–93% of the zinc content of that part of the zinc ore used here. The pure jarosite residue, which has the following approximate composition:

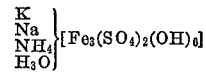

and, in leached state, is approximately free from zinc, will thus be contaminated by the zinc ferrites which remain undissolved during the iron precipitation and, in consequence, the zinc content in the jarosite residue may be as much as 5–6%, which results in the total zinc yield obtained by the hydro metallurgic zinc process described in the applicant's abovementioned U.S. patent being reduced from 98–99% to 95–96% on treatment of a zinc ore which contains 9% Fe.

The present invention resides in subjecting the said residue to leaching with aqueous sulphuric acid at temperatures in the range of 50–95° C., preferably 90–95° C., and an acid concentration of 10–70, preferably 30–60 g./l. This acid leaching may be carried out by direct addition of $H_2SO_4$ when the said precipitation of iron is finished, or it may be carried out after the residue has first been thickened to a slurry with, for example, 350–450 g./l. solid material. The residue may also be further dewatered by filtering.

EXAMPLE 1

After precipitation of jarosite at a pH of about 1.5 (or 3–5 g./l. $H_2SO_4$), $H_2SO_4$ was added to the suspension to the concentration of about 10 g./l. $H_2SO_4$, and the suspension was subjected to further leaching (conditioning) of the slurry before this was thickened. Any effect from precipitated colloidal iron hydroxide, silica and other colloidal compounds being thereby eliminated. A suspension was obtained which gave improved clearing and sedimentation properties when using smaller amounts of flocculating agents and, at the same time, the filtering properties were improved. The zinc content in the dry material of the slurry was reduced from 6% to 5% by means of this acid treatment (conditioning).

EXAMPLE 2

To 1 liter jarosite slurry with 425 g./l. solid material was added 1 liter of diluted, hot sulphuric acid containing 200 g./l. $H_2SO_4$. After two hours leaching at 90° C. and mechanical agitation, the zinc content in the jarosite residue was 2,8%. The zinc content in the jarosite residue prior to the acid treatment was 5,9%.

The total yield of the hydrometallic zinc process, with hot, sulphuric acid leaching of the neutral residue, jarosite precipitation of the dissolved iron and post treatment of jarosite slurry in accordance with the present invention, was then 97–98% with a zinc ore containing for example 9% Fe as starting material, in contrast to 95–96% without post treatment of the jarosite slurry.

I claim:
1. A process for conditioning colloidal compounds present in and to decompose zinc ferrites present in jarosite residues produced by precipitating iron in zinc sulphate solutions in the presence of an added ion selected from the group consisting of K, Na and NH$_4$ and mixtures thereof, the process comprising leaching the said jarosite residue with aqueous sulphuric acid having a concentration of 10 to 70 g./l. of H$_2$SO$_4$, and carrying out the leaching operation at a temperature of 50 to 95° C.

2. A process as claimed in claim 1, including the step of leaching the jarosite residue at a temperature within the range of 90 to 95° C. with an aqueous sulphuric acid having a concentration of 30 to 60 g./l. of H$_2$SO$_4$.

3. A process as claimed in claim 1, including the step of adding solid material to the jarosite residue to be leached in a proportion of 350 to 450 g./l. thereby improving the filtering qualities of the resulting material produced by the leaching operation.

References Cited
UNITED STATES PATENTS

| | | | |
|---|---|---|---|
| 3,434,798 | 3/1969 | Menendez et al. | 75—120 X |
| 3,434,947 | 3/1969 | Steintveit | 75—120 X |
| 3,493,365 | 2/1970 | Pickering et al. | 75—120 X |

GEORGE T. OZAKI, Primary Examiner

U.S. Cl. X.R.

75—115, 120; 23—125